United States Patent [19]

Wessel

[11] 4,441,018

[45] Apr. 3, 1984

[54] CARD READER WITH AIR PASSAGE CLEANING STRUCTURE

[75] Inventor: Kenneth R. Wessel, White Plains, N.Y.

[73] Assignee: Sealectro Corporation, Mamaroneck, N.Y.

[21] Appl. No.: 337,490

[22] Filed: Jan. 6, 1982

[51] Int. Cl.³ .............................................. G06K 7/10
[52] U.S. Cl. .................................. 235/458; 235/454; 235/474; 235/182
[58] Field of Search ............... 235/454, 458, 474, 475, 235/482, 486, 382, 386, 483, 484, 485, 383, 384, 385

[56] References Cited

U.S. PATENT DOCUMENTS 4,114,028 9/1978 Baio et al. ............................ 235/458

4,140,273 2/1979 Townsend et al. .................. 235/485

*Primary Examiner*—A. D. Pellinen
*Assistant Examiner*—Robert Lev
*Attorney, Agent, or Firm*—Anthony J. Casella; Gerald E. Hespos

[57] ABSTRACT

An optical punched card reading apparatus is disclosed wherein a plurality of air passageways are disposed throughout the apparatus. The various electrical and photo-electric components in the apparatus generate heat and through convection heat the air. The temperature differentials cause pressure differentials which in turn cause air flow in the apparatus. The air passageways channelize the air flow, removing dust and dirt particles that otherwise would accumulate in the photo-electric components of the apparatus.

10 Claims, 8 Drawing Figures

CARD READER WITH AIR PASSAGE CLEANING STRUCTURE

BACKGROUND OF THE INVENTION

The subject invention relates to optical punched card and badge readers. These devices typically hold fixed instructions or data, and are particularly useful in security systems, hospitals, parking lots, time-clocks and other data collection or process control systems.

As is well known, optical card readers transform the punched holes in data cards into electrical impulses. This is accomplished by passing the data card between an array of light sources and a corresponding array of light-sensors, typically photoelectric cells. Light from the light source will be detected by the photoelectric cells at locations on the data card where a punched hole exists, thereby generating an electric impulse. These generated signals then are carried by well known circuitry to a readout terminal or device.

U.S. Pat. No. 4,114,028 which issued to Alfred R. Baio on May 26, 1977, entitled "Optical Punched Card Reader" and which is assigned to the assignee of the subject application, discloses a device which utilizes the principles described above. It is seen in FIG. 1 of that patent that the apparatus includes a slot that is dimensioned to slidably accept the data card. FIGS. 4 and 5 of that patent further show that the apparatus includes a strobe generator which cooperates with the data card to slide within the slot toward and away from the opening in the apparatus. The electrical components of the apparatus generate heat and through convection heat the air. Variations in the temperature of the air within and in the immediate vicinity of the apparatus cause pressure differentials which in turn cause air flow. Similarly, the movement of the data card and the strobe generator within the narrow space provided for them in the apparatus creates air movement with corresponding pressure differentials and turbulence. Dust or dirt particles carried by either the air or the data card itself accumulate over time on the various internal parts of the apparatus including the light sources and the photoelectric cells. A sufficient accumulation of this foreign matter obliterates the light sending and light receiving devices. When this occurs, the affected punched holes in the data card are not detected by the card reader.

Due to the potential problem of dirt accumulation, optical punched card readers of this type require frequent cleaning to prevent malfunction. Obviously, this cleaning process imposes an additional cost upon the operation of the apparatus.

Accordingly, it is an object of the subject invention to provide an optical punched card reader that requires considerably less maintenance and cleaning.

It is another object of the subject invention to provide an optical punched card reader that is less susceptible of misreading the data instructions on the punched card.

SUMMARY OF THE INVENTION

The optical punched card reader of the subject invention includes a first plate having a recess extending rearwardly from the front edge thereof. The recess is dimensioned to slidably receive a punched data card having a plurality of columns and rows. A row of apertures which correspond in number and spacing to the rows on the data card is disposed in the recess parallel to the front edge of the first plate. The first plate also includes a centrally located strobe aperture, as well as a plurality of apertures to detect orientation, degree of insertion and other operational parameters.

The subject reader further includes a strobe generator slidably mounted on the first plate and movable toward and away from the front and rear edges of the first plate. The strobe generator includes a column of slots disposed perpendicular to the row of apertures on the first plate and in alignment with the strobe aperture. The number and spacing of the slots on the strobe generator corresponds to the columns on the data card. A data card inserted into the reader will move the strobe generator away from the row of apertures on the first plate. As a result, the slots of the strobe generator will pass over the strobe aperture of the first plate intermittently covering the aperture. Preferably, the strobe generator is spring biased, and will return to its position nearest the front edge of the first plate after the inserted data card has been removed.

A second plate, which is of substantially the same configuration as the first plate, is mounted on the first plate, over the strobe generator. The second plate includes a row of spaced apertures and a centrally located strobe aperture all of which are in register with the corresponding apertures of the first plate.

The first and second plates include elongated channels which define air passageways. These channels extend from locations on the plates, preferably rearward of the row of apertures, to appropriate exit locations at the rear and side edges of at least one of the plates. The specific locations for these channels are selected to channelize air currents over the parts that are most susceptible to dirt accumulation as described further below.

The first plate has a printed circuit board attached to its surface opposite the recess. Similarly, the second plate has a printed circuit board attached to its surface opposite the recess in the first plate. Light sources, typically light emitting diodes, are connected to one printed circuit board, and light sensors, typically phototransistors, are connected to the other printed circuit board. The light sources and sensors are equal in number to the apertures on the plates, and they are disposed on the printed circuit boards to extend into the apertures. The circuit boards also contain circuitry for connecting the board to a power source and a readout device.

In operation, as a punched data card is inserted into the reader, the columns of the card will pass between the apertures of the two plates. Where a punched hole exists, a light signal transmitted from a light source will pass through the aperture in which the light source is mounted, through the punched hole in the data card, through the corresponding aperture on the opposed plate, and will be received by the light sensor mounted in the aperture on the opposed plate. Simultaneously, the card being inserted displaces the strobe generating slide causing its slots to pass between the strobe apertures of the two plates. The light source mounted in the one strobe aperture creates a series of intermittent light signals corresponding in number and spacing to the columns of the data card. As a result, the row component of each data point on the punched data card will be sensed by the light signal from the row of apertures parallel to the front edge of the plates, while simultaneously, the column component of each data point will be sensed by the signal created by the strobe generating slide.

The subject reader further may include additional apertures, light sources and light sensors appropriately disposed to detect the position, the orientation and the end of the inserted data card. Thus, appropriate light signals can be transmitted to the readout device to indicate if the card is properly positioned and oriented. If it is not, an improper combination of signals will be transmitted which will not be accepted by the readout device. Similarly, if data signals continue to be generated after the reader has transmitted a signal indicating the end of invalid card, the data transmitted will not be processed.

The subject invention is designed to capitalize on the movement of air resulting both from temperature and related pressure differentials and from the movement of the card and the strobe generating slide within the recess. Specifically, the invention channelizes the air flow into air passageways in the first and second plates. The air passageways define grooves or channels in the surfaces of the plates adjacent to the recess. These channels extend along the surfaces of the plates to appropriate exit points at the edges of the plates. They are located to channelize the air past the components that are most susceptible to dirt accumulation.

In addition to the air passageways on the two plates, other air passageways may be provided on the strobe generating slide to channelize air movement passed the strobe generators The air passageway on the strobe generating slide could be aligned with an appropriate exit at the rear edge of the two plates.

To further facilitate the removal of dust and dirt from the light sources and light sensors, the corner of each aperture adjacent to the recess may be beveled. Thus the air current will follow the contoured surface formed by the beveled edge, and in the process will flow directly over the light sources and sensors.

DESCRIPTION OF THE PREFERRED EMBODIMENTS

Figure 1:
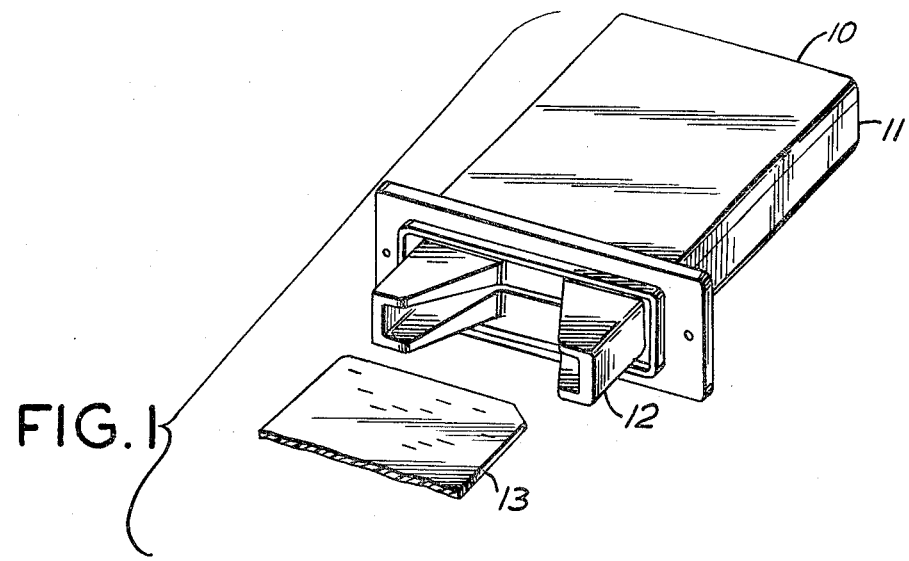
FIG. 1 is a perspective view of the punched card reader of the subject invention in its assembled form.

Referring to FIG. 1, the housing for the optical punched card reader of the subject invention is illustrated in its assembled form. Specifically, the housing includes a top cover 10, a bottom cover 11, and a card receiving member 12 for receiving data card 13.

Figure 2:
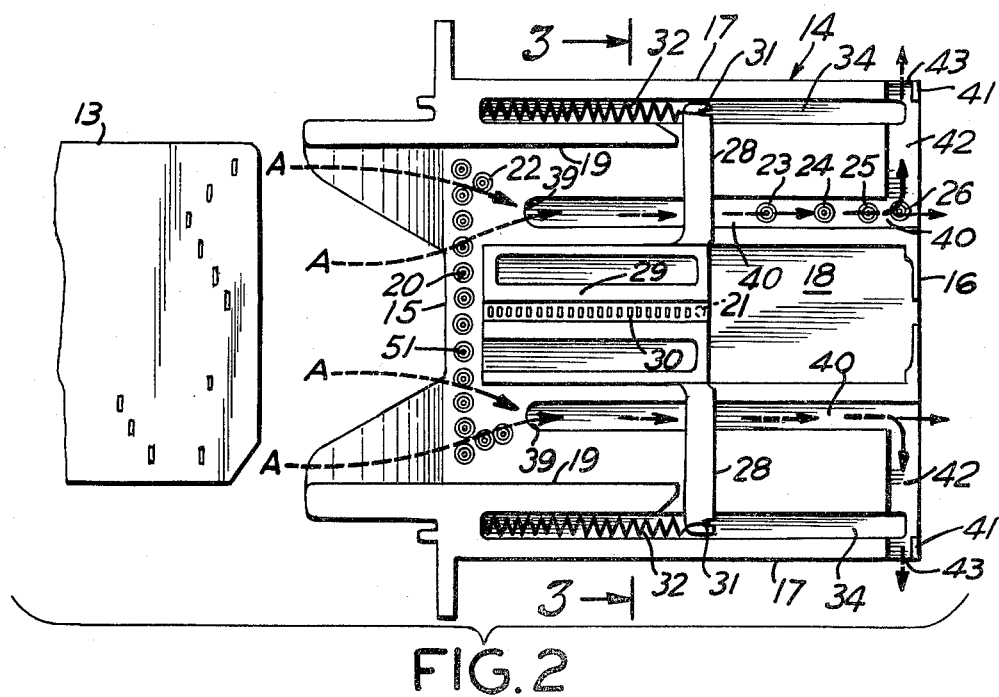
FIG. 2 is a plan view of the first plate and the strobe generator of the subject invention.

The subject card reader is adapted to serially read the columns on punched data cards. As illustrated in FIG. 2, the punched card 13 is in the form of a badge containing a plurality of rows and columns of data points. The card 13 is generally rectangular in configuration preferably having one corner thereof cut. As will be described later, the dimensions of the card 13 may actually form part of the input code and a validity check in the card reader system.

FIG. 2 also shows the first plate 14 of the card reader. First plate 14 has a front edge 15, a rear edge 16, and two opposed side edges 17. The first surface of first plate 14 includes a recessed portion indicated generally by number 18. Side walls 19, which extend parallel to side edges 17 of first plate 14, partially define recess 18 and are sufficiently separated for recess 18 to slidably accept data card 13.

The first plate 14 also includes data sensing apertures 20 disposed in said recess in a row that is perpendicular to the side walls 19 of the recess 18. These data sensing apertures 20 correspond in number and spacing to the rows on the data card 13. The first plate 14 also includes a strobe aperture 21 centrally located between the side walls 19 of the recess 18. The preferred embodiment also provides several other apertures disposed about the recess 18 of the first plate 14. Orientation sensing aperture 22 is provided to insure that the data card 13 is inserted properly into the card reader. An improperly oriented data card 13 will be detected by orientation sensing aperture 22, and thus will insure that the punched holes are not read. Back sensor apertures 23, 24, 25 and 26 are provided to detect the complete insertion of the data card. The circuitry used with the card reading apparatus can insure that the punched holes in the data card 13 are read as the data card 13 is removed from the card reading apparatus. In this arrangement, the data sensors will not be activated until a proper signal is received from the back sensors located in back sensor apertures 23, 24, 25 and 26.

Figure 3:
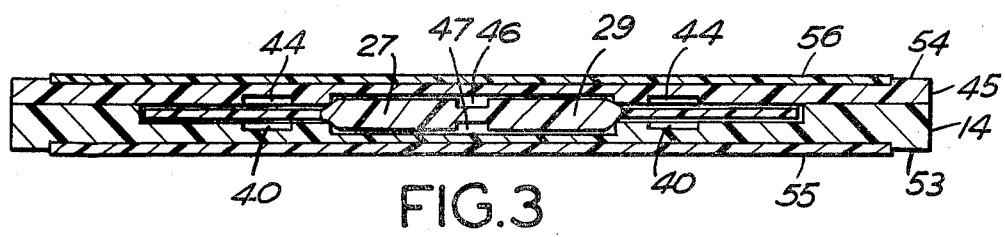
FIG. 3 is a cross-sectional view of the subject invention viewed from the front.

As shown in FIG. 3, a second plate 45 is provided to cover the first plate 14. The second plate 45 assumes substantially the same configuration as the first plate 14, and provides one aperture for each aperture on the first plate 14 such that pairs of registered apertures are provided by the two plates.

A light source 51, typically a light emitting diode (LED), is mounted in each aperture of the first plate 14. A light sensor 49, typically a photoelectric cell or a phototransistor is mounted in each aperture of the second plate 45. Printed circuit boards 55 and 56, located on surface 53 of first plate 14 and surface 54 of second plate 45, connect the light sources 51 and light sensors 49 to a read out device (not shown) for interpreting the data on the data card 13.

Light sources 51, light sensors 49 and the electrical components in the read out device (not shown) generate heat which by convection heats the air close to these components. The heated air is less dense than the air that is not heated. This temperature differential creates an air flow toward the heated areas of the apparatus. As explained below this air flow is channelized appropriately to clean the light sources 51 and sensors 49.

Returning to FIG. 2, strobe generating slide 27 is slidably mounted within the recess 18 of the first plate 14. The strobe generating slide 27 is generally T-shaped in configuration, and includes two arm portions 28 and an elongated rectangular base portion 29. The longitudinal axis of the elongated base portion 29 of the strobe generating slide 27 is centrally located between the side walls 19 of recess 18, and extends perpendicular to the row of data sensing apertures 20.

Evenly spaced slots 30 are disposed along and perpendicular to the longitudinal axis of the base portion 29 of the strobe generating slide 27. The number and spacing of slots 30 corresponds to the columns of data card 13. As the data card 13 is inserted into the reader, the data card 13 will displace the strobe generating slide 27 away from the data sensing apertures 20 such that the slots 30 pass between the strobe generating aperture 21 of the first plate and corresponding strobe generating aperture of the second plate. The distance between the strobe generating aperture 21 and the data sensing apertures 20 is such that when a slot of the strobe generating slide 27 is aligned with the strobe aperture 21 a column of data card 13 simultaneously will be aligned precisely with the data sensing apertures 20.

In the preferred embodiment of the subject invention, the strobe generating slide 27 is biased to return to its normal position once data card 13 has been removed from the reader. As illustrated in FIG. 2, the arm members 28 of the strobe generating slide 27 are disposed perpendicular to the column of slots 30. Each arm member 28 includes a notch 31 at the end thereof most distant from the column of slots 30. Two helical spring members 32 are attached respectively at one end to the notches 31 of the arm members 28 and at the other end to the first plate 14. Preferably, the first plate 14 includes two groove portions 34 for housing the spring member 32. The arm member 28 performs a secondary function when it passes between the back sensors 23, 24, 25 and 26 by detecting the complete insertion of the data card 13.

The first plate 14 also provides two air passageways 40 which define channels in first plate 14. Each air passageway 40 extends perpendicular to the row of data sensing apertures 20. More particularly, each air passageway 40 extends from a point just rearward of the row of data sensing apertures 20 to the rear edge 16 of first plate 14. Air passageways 40 are located approximately midway between strobe aperture 21 and side walls 19 and recess 18. Rear edge 16 of first plate 14 defines elongated open areas 42 into which air passageways 40 extend. Support posts 41 are provided at rear edge 16 of first plate 14 to support and separate the second plate (not shown) therefrom. Open areas 42 extend to and intersect side edges 17 of first plate 14 thereby defining side exits 43. By this arrangement, open areas 42 define elongated exit areas for air passageways 40 in rear edge 16 of first plate 14. The elongated open area 42 in first plate 14 enables a substantial flow of air to exit through the rear edge 16 and side edges 17 of first plate 14, and thus minimizes the possibility of dust or dirt particles becoming trapped in air passageway 40.

FIG. 2 also shows that one air passageway 40 is substantially colinear with the back sensor apertures 23, 24, 25 and 26. The forwardmost point 39 of each passageway 40 is rounded and slopes from the surface of recess 18 to the deepest point 38 of air passageway 40. This configuration is to facilitate the flow of air between air passageway 40 and the front edge 15 of the first plate 14. In the preferred embodiment, as explained further below, the air, indicated by arrows A, flows from front to rear through air passageways 40. The air A will enter the recess 18 uniformly distributed across the front edge 15 of base plate 14, but will converge as it approaches air passageways 40. As the air A travels from the front edge 15 to air passageways 40, it will flow over the data sensing apertures 20 with a sufficient velocity to remove any dust or dirt deposited on the light sources or sensors located in the apertures.

The second plate 45, which is shown in FIG. 3, includes two air passageways 44 which are substantially in register with air passageways 40 of the first plate 14. Foreign matter traveling through air passageways 44 is removed from the card reader through open area 42 and side exit 43 in first plate 14.

Figure 4:
FIG. 4 is a partial side view of the subject invention.

FIG. 4 shows the exit 43 in the side edge 17 which enables the air and the dirt particles carried therewith to be removed from air passageways 40 and 44 in the first plate 14 and the second plate 45 respectively.

Figure 5:
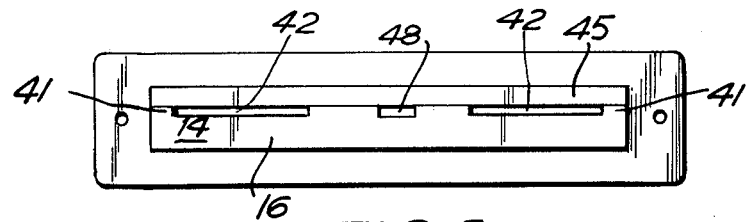
FIG. 5 is a rear view of the subject invention.
Figure 7:
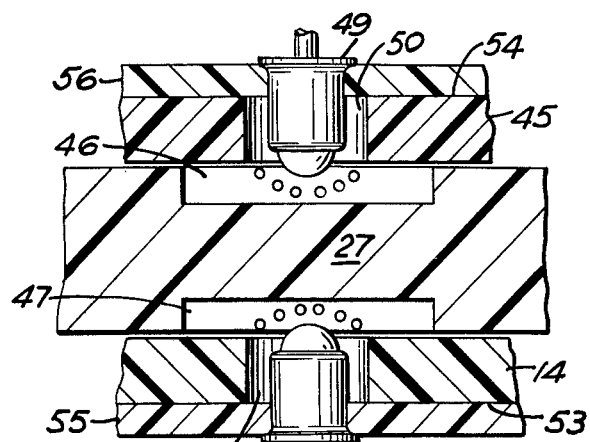
FIG. 7 is a partial cross-sectional view of the subject invention taken from the front showing the strobe generating components.

In the preferred embodiment, as shown in FIGS. 2 and 7, air passagways 46 and 47 extend along the longitudinal axis of the elongated base portion 29 of the strobe generating slide 27 such that slots 30 extend through strobe generating slide 27 from air passageway 46 to air passageway 47. The rear edge 16 of the first plate 14 includes an exit 48 aligned with air passageways 46 and 47. As shown most clearly in FIG. 7, air passageway 46 is aligned with the phototransistor 49 in a strobe aperture 50 of the second plate 45. Similarly, the air passageway 47 in strobe generating slide 27 is aligned with the light emitting diode (LED) in the strobe aperture 21 of the first plate 14. By this arrangement, air indicated by the small circles in FIG. 7, passing through air passageways 46 and 47 will remove dust and dirt particles which otherwise would deposit on phototransistor 49 and LED 51, and will carry these dirt particles to exit 48 at the rear edge 16 of first plate 14, as shown in FIG. 5.

Figure 8:
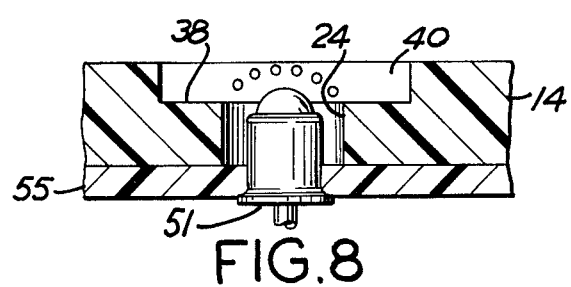
FIG. 8 is a partial cross-sectional view of the subject invention viewed from the front showing one plate and a back sensor.

Back sensor apertures 23, 24, 25 and 26 as shown in FIG. 2, are located in line with air passageways 40, as described above. FIG. 8 shows a cross-sectional view of back sensor 24 located in air passageway 40. FIG. 8 shows that air, indicated by the small circles, travelling through air passageway 40 will also clean LED 51 in back sensor aperture 24, and similarly, will clean the other back sensors not shown.

Figure 6:
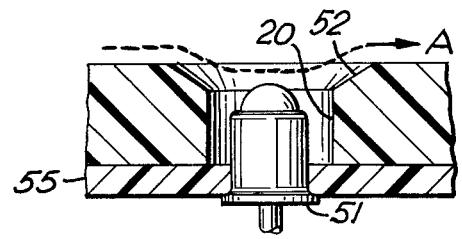
FIG. 6 is a partial cross-sectional view of a plate of the subject invention showing the data sensing apertures.

FIG. 6 shows that first plate 14 intersects data sensing aperture 20 at beveled edge 52. This beveled edge 52 directs the airflow in a manner shown by arrows "A". This airflow pattern encourages a more thorough cleaning of the light sources and light sensors located in the data sensing apertures 20.

As mentioned above, the invention is designed to channelize air flow caused by pressure differentials which in turn are caused by variations in temperature and the movement of parts in the card reader. However, a means for generating air flow could be connected to open area 42 in first plate 14 and exit 48 in the rear edge 16 of the first plate 14. The means used to achieve this airflow could be any simple commercially available vacuum pump. Since the areas of the recess and the air passageways is relatively small, a rapid velocity of air movement can be obtained with a relatively low volume of air movement achieved by the vacuum pump. The means for generating the airflow may be electrically connected by standard circuitry to a pair of apertures. By this arrangement, the means for generating the airflow may be activated once each time the card reading apparatus is used.

It should be noted that the preferred embodiment is designed to accommodate air flow from the front edge 15 of the first plate 14 through air passageways 40, 44, 46 and 47 and out exits 43 and 48 and open area 42. However, the subject card reader could be adapted to direct the airflow in the opposite direction.

In summary, an optical punched card reader is provided wherein a plurality of air passageways are disposed throughout the apparatus. Air flow is generated by temperature differentials in the apparatus. Air is drawn into the front of the card reader and passes over the phototransistors and light emitting diodes. The air then proceeds through the air passageways and exits the card reader carrying with it dust and dirt particles which otherwise would have accumulated on the light sensors and light emitters.

What is claimed is:

1. An optical punched-card reading apparatus for use with a punched data card having a plurality of columns and rows, said apparatus comprising an assembly of components designed to channelize air flow through said apparatus for removing foreign matter therefrom, said components, including:

a substantially rectangular first plate having opposed first and second surfaces, and front, rear and two opposed side edges, the first surface of said first plate having a recess extending rearwardly from the front edge thereof and dimensioned to slidably accept the data card, said first plate further including a first row of data sensing apertures disposed in said recess parallel to the front edge of said first plate, said first row of data sensing apertures corresponding in number and spacing to the rows on the data card, said first plate further including a first strobe aperture centrally located in said recess, said data sensing and strobe apertures extending through to the second surface of said first plate, said first plate further including at least one air passageway defining an elongated channel in said recess, said air passageway extending continuously from a point intermediate the edges of said first plate and rearward the first row of data sensing apertures to at least one exit at least one said edge of said first plate, whereby said air passageway in said first plate accommodates air flow for removing foreign matter from said apparatus;

a second plate with opposed first and second surfaces having substantially the same configuration as said first plate and being mounted on said first plate such that the first surface of said second plate covers the recess on the first plate, said second plate including a second row of data sensing apertures and a second centrally located strobe aperture, each said aperture on said second plate extending from the first surface to the second surface thereof and being in register with a corresponding aperture on said first plate forming a pair of registered apertures, said first surface of said second plate further including at least one air passageway defining an elongated channel extending continuously from a point intermediate the edges of said second plate and rearward of said second row of data sensing apertures to at least one exit from said punched-card reading apparatus, whereby said air passageway in said second plate accommodates air flow for removing foreign matter from said apparatus;

a light sensitive sensor mounted within one aperture of each said pair of registered apertures, and a light source mounted in the other aperture of each said pair of registered apertures;

electrical means for connecting said light sources and said light sensors to a readout device and power source;

a strobe generating slide for cooperating with the data card to generate intermittent light signals as the data card is inserted into said apparatus, said strobe generating slide being mounted in the space formed by said recess of said first plate and the first surface of said second plate such that said slide is slidably movable toward and away from the front and rear edges of said first plate; and a housing for enclosing said assembly of components, whereby the movement of the data card passed the row of data sensing apertures of said first and second plates along with the simultaneous movement of said strobe generating slide passed the strobe apertures of said first and second plates generates a combination of signals for transmitting the data on the data card to the readout device.

2. An optical punched-card reading apparatus as recited in claim 1 wherein said first and second plates each include two air passageways.

3. An optical punched-card reading aparatus as recited in claim 2 wherein one of said air passageways on each said plate is located between said centrally located strobe aperture and one of said side edges of said plate, and wherein the second of said air passageways on each said plate is located between the centrally located strobe aperture and the other of said side edges of said plate.

4. An optical punched-card reading apparatus as recited in claim 3 wherein each said air passageway of said first and second plates extends from a point rearward of said row of data sensing apertures in a direction parallel to the side edges of said first and second plates to an elongated exit extending along the rear edge of said first plate and the rear portion of one of the side edges of said first plate, said apparatus further including a plurality of support posts extending between the rear edges of said first and second plates providing support therebetween.

5. An optical punched-card reading apparatus as recited in claim 4 wherein each said air passageway on said first and second plates includes two side walls substantially perpendicular to the surfaces of said first and second plates and a bottom wall substantially parallel to said surfaces of said first and second plates.

6. An optical punched card reading apparatus as recited in claim 5 wherein said side and bottom walls of each said air passageway in said first and second plates are contoured to meet the surfaces of said first and second plates at the ends of said air passageways closest to said row of data sensing apertures, thereby facilitating the flow of air into said air passageways.

7. An optical punched-card reading apparatus as recited in claim 1 wherein the surface of said strobe generating slide nearest said first plate and the surface of said strobe generating slide nearest the second plate each include an air passageway defining a channel extending parallel to the side edges of said first plate and centrally located between said side edges such that said air passageways on said strobe generating slide are aligned with said centrally located strobe apertures.

8. An optical punched-card reading apparatus as recited in claim 7 wherein centrally located between the side edges of said first plate and extending from said recess through the rear edge of said first plate is a rear air passageway exit, said rear air passageway exit being alignable with said air passageway in said strobe generating slide.

9. An optical punched-card reading apparatus as recited in claim 1 wherein the corners formed by said apertures and the first surface of each said plate is beveled to improve the flow of air across said apertures and into contact with said light sources and light sensors.

10. An optical punched-card reading apparatus as recited in claim 1 wherein a compression pump means is connected to said apparatus to facilitate the air flow therethrough.

* * * * *